United States Patent [19]

Maurer et al.

[11] 4,399,114
[45] Aug. 16, 1983

[54] PROCESS FOR THE DEARSENIFICATION OF POLYPHOSPHORIC ACID

[75] Inventors: Alexander Maurer, Hürth; Gero Heymer, Erftstadt; Markus Erpenbach, Cologne, all of Fed. Rep. of Germany

[73] Assignee: Hoechst Aktiengesellschaft, Fed. Rep. of Germany

[21] Appl. No.: 402,941

[22] Filed: Jul. 29, 1982

[30] Foreign Application Priority Data

Aug. 17, 1981 [DE] Fed. Rep. of Germany ....... 3132428

[51] Int. Cl.$^3$ .............................................. C01B 25/16
[52] U.S. Cl. ................................................ 423/321 R
[58] Field of Search .................. 423/321 R, 305, 307, 423/320

[56] References Cited

U.S. PATENT DOCUMENTS 3,790,661 2/1974 Wasel-Nielen et al. ........ 423/321 R

*Primary Examiner*—Gregory A. Heller
*Attorney, Agent, or Firm*—Connolly and Hutz

[57] ABSTRACT

The disclosure relates to a process for the continuous dearsenification of polyphosphoric acid with the aid of hydrogen sulfide in a gas admission zone. To this end, the disclosure provides for the acid to be dearsenified in a gas admission zone subdivided so as to comprise at least two separate liquid matter-receiving zones, each zone being separated from the other by means of a separate gas zone; for the liquid in each of the liquid matter-receiving zones to be maintained at a level 0.1 up to 10 cm high, without admission of gas; for hydrogen sulfide which remained unreacted in the individual liquid matter-receiving zones to be collected in the respective gas zone and for it to be finely redispersed in the liquid matter-receiving zone directly upstream of the respective gas zone by allowing the hydrogen sulfide to flow through a plurality of openings into the acid, the latter being delivered from the respective liquid-matter-receiving zone into the next downstream liquid-matter-receiving zone, and introduced thereinto directly below the liquid matter level therein; for precipitated arsenic sulfide to be separated from the acid coming from the lower end of the gas admission zone, and for the filtrate obtained to be freed from gaseous hydrogen sulfide in excess.

5 Claims, No Drawings

PROCESS FOR THE DEARSENIFICATION OF POLYPHOSPHORIC ACID

A process for the dearsenification of polyphosphoric acid, wherein gaseous hydrogen sulfide is introduced into a packed gas admission zone, countercurrently with respect to the polyphosphoric acid in that zone, the arsenic is precipitated in sulfide form, the acid is freed from gaseous hydrogen sulfide in excess by means of compressed air, and the arsenic sulfide is separated from the acid by filtration has already been described (cf. U.S. Pat. No. 3,790,661).

An adverse effect associated with this prior process resides in that the acid is required to remain in the packed column over a relatively long period of time. As a result, the space/time-yields are poor. In addition to this, the removal of hydrogen sulfide by means of compressed air prior to subjecting the arsenic sulfide to filtration, is liable to entail oxidative redissolution of the arsenic.

The present invention now provides an improved process for the continuous dearsenification of polyphosphoric acid which provides for the acid heated to a temperature of more than 80° C. to be introduced from above into a gas admission zone and to be contacted countercurrently therein with circulated gaseous hydrogen sulfide introduced into the gas admission zone from below, for the arsenic to be precipitated in the form of arsenic sulfide, and for the acid to be separated from the arsenic sulfide by filtration and also from gaseous hydrogen sulfide in excess by means of compressed air.

The invention comprises more specifically:

(a) dearsenifying the polyphosphoric acid in a gas admission zone subdivided so as to comprise at least two separate liquid matter-receiving zones, each zone being separated from the other by means of a separate gas zone;

(b) maintaining the liquid in each of the liquid matter-receiving zones at a level 0.1 up to 10 cm high, without admission of gas;

(c) permitting hydrogen sulfide which remained unreacted in the individual liquid matter-receiving zones to collect in the respective gas zone and finely redispersing it in the liquid matter-receiving zone directly upstream of the respective gas zone by allowing the hydrogen sulfide to flow through a plurality of openings into the acid, the latter being delivered from the respective liquid matter-receiving zone into the next downstream liquid matter-receiving zone, and introduced thereinto directly below the liquid matter level therein;

(d) separating precipitated arsenic sulfide from the acid coming from the lower end of the gas admission zone; and (e) freeing the filtrate obtained from gaseous hydrogen sulfide in excess.

The gas admission zone should preferably be subdivided so as to comprise 5 to 10 separate liquid matter-receiving zones and the respective pertinent gas zones. The gas admission zone can basically be subdivided so as to comprise more than 10 liquid matter-receiving zones but this is generally not desirable for reasons of economy.

It is also good practice to maintain the hydrogen sulfide cycle under an overpressure of 0.2 up to 1.0 bar, depending on the drop of pressure inside the gas admission zone.

A further preferred feature provides for the gaseous hydrogen sulfide to be passed through the liquid matter-receiving zones at a rate of 40 up to 200 l/h per $cm^2$ surface area of these zones.

As a result of the liquid matter level in the liquid matter-receiving zones being intentionally kept low, the acid becomes completely saturated with hydrogen sulfide in each of these zones, and the relatively small gas bubbles are effectively prevented from agglomerating to large bubbles, downstream of the liquid matter-receiving zones; large bubbles would incidentally result in the active surface area of the gas becoming reduced.

It is preferable for the gas admission zone to be heated to the extent necessary for the initial 80° C. to about 120° C. temperature of polyphosphoric acid to be maintained during the process.

The gas throughput rate through the gas admission zone greatly depends on the quantity of polyphosphoric acid put through. The ratio by volume of polyphosphoric acid to gaseous hydrogen sulfide put through should be less than $1 \times 10^{-3}$. More $H_2S$-gas, within the limits of 40 up to 200 l/h per $cm^2$, is admitted at higher polyphosphoric acid throughput rates, and less $H_2S$-gas, within the limits specified, is admitted at lower polyphosphoric acid throughput rates. It is good practice however to avoid prolonged operation outside the lower limiting value. Needless to say it is basically possible to operate outside the upper limiting value, but this should not be done for reasons of economy, and in an attempt to avoid the carrying along of liquid droplets with the gas stream.

The present process makes it possible for the residence time of the polyphosphoric acid in the gas admission zone to be reduced to less than 1 hours, generally to 3 to 10 minutes. This is a beneficial effect in which the present process compares very favorably with the prior process described in U.S. Pat. No. 3,790,661, since it permits use to be made of smaller apparatus than theretofore without affecting the degree of efficiency.

After having been subjected to the gas treatment described, the polyphosphoric acid loaded with arsenic sulfide is filtered with the aid of standard filtration means, e.g. with the use of a pressure filter. Needless to say filtration aids, such as active carbon (0.05 up to 0.5%) and kieselguhr (0.1 up to 1.5%) can be used. A filter having a precoat layer of kieselguhr applied to it should preferably be used, the kieselguhr being employed at a rate of 0.5 up to 3 $kg/m^2$. It is normally sufficient however to use a sufficiently fine filter, e.g. a metal fleece.

After filtration, clear polyphosphoric acid having hydrogen sulfide dissolved in it is obtained from which it is freed in known fashion by treatment with dry air or nitrogen, preferably at a temperature of 80° up to 150° C.

Polyphosphoric acid first freed from dissolved hydrogen sulfide by means of compressed air and then filtered, is found again to contain minor proportions of arsenic. This is avoided in the present process by effecting the individual steps in the following sequential order: precipitation of arsenic sulfide; filtration of arsenic sulfide; removal of hydrogen sulfide. This gives polyphosphoric acid containing $\leq 1$ ppm arsenic.

The following Examples illustrate the invention:

EXAMPLE 1

600 g/h polyphosphoric acid (density=2.06) containing 84% $P_2O_5$ and 20 ppm arsenic and preheated to 100° C. was introduced from above into a gas admission zone 50 mm wide and 50 cm high provided with 5 perforated trays, each with 350 perforations. The residence time in the gas admission zone was 10 minutes. 0.5 cm high, without admission of gas, was the filling level on each of the individual trays. 61.2 l/h per $cm^2$ gaseous hydrogen sulfide was introduced from below into the gas admission zone, countercurrently with respect to the acid, the hydrogen sulfide cycle being maintained under a pressure of 0.5 bar. The ratio by volume of polyphosphoric acid (briefly PPA) to $H_2S$ was $1.2\times10^{-4}$. The acid so gas-treated was admixed with 0.05% active carbon and 0.25% kieselguhr, and filtered. Next, it was freed from dissolved hydrogen sulfide by means of dry compressed air. Clear polyphosphoric acid which contained 84% $P_2O_5$ and less than 1 ppm arsenic was obtained.

EXAMPLE 2

The procedure was as in Example 1, but 2000 g/h polyphosphoric acid (density=2.06) was passed through the gas admission zone. 1.0 cm high was the filling level on each tray and 128 l/h per $cm^2$ gaseous hydrogen sulfide was introduced countercurrently with respect to the acid. The ratio by volume "PPA/$H_2S$" was $3.8\times10^{-4}$. The residence time of the acid in the gas admission zone was 6 minutes. The acid so treated contained less than 1 ppm arsenic.

EXAMPLE 3

The procedure was as in Example 2, but only 76.5 l/h per $cm^2$ hydrogen sulfide was used, the ratio by volume of "PPA/$H_2S$" being $6.5\times10^{-4}$. The acid so treated also contained less than 1 ppm arsenic.

EXAMPLE 4

The procedure was as in Example 2 but only 30.6 l/h per $cm^2$ hydrogen sulfide was used. This gave a ratio by volume of PPA/$H_2S$ of $1.6\times10^{-3}$. The acid so treated was found to contain 3 ppm arsenic.

EXAMPLE 5

The procedure was as in Example 1. 1200 g/h polyphosphoric acid (density=2.06) was put through and contacted countercurrently with 76.5 l/h per $cm^2$ hydrogen sulfide. The ratio by volume "PPA/$H_2S$" was $3.9\times10^{-4}$. The residence time of the acid in the gas admission zone was about 5 minutes, and 0.5 cm high was the filling level on each tray. After gas treatment, the acid was freed at 100° C. in an agitator-provided vessel from hydrogen sulfide in excess with the aid of compressed air and the use of a submerged frit. Next, the acid so freed from hydrogen sulfide was admixed with 0.05% active carbon and 0.25% kieselguhr and filtered with the use of a pressure filter which has a precoat layer of 1.0 kg/$m^2$ kieselguhr applied to it. The clear acid contained 3 ppm arsenic.

We claim:

1. In the process for the continuous dearsenification of polyphosphoric acid, wherein the acid heated to a temperature of more than 80° C. is introduced from above into a gas admission zone, contacted countercurrently therein with circulated gaseous hydrogen sulfide introduced into the gas admission zone from below, the arsenic being precipitated in the form of arsenic sulfide, and the acid being separated from the arsenic sulfide by filtration and also from excess gaseous hydrogen sulfide by means of compressed air, the improvement which comprises:
   (a) dearsenifying the polyphosphoric acid in a gas admission zone subdivided so as to comprise at least two separate liquid matter-receiving zones, each zone being separated from the other by means of a separate gas zone;
   (b) maintaining the liquid in each of the liquid matter-receiving zones at a level 0.1 up to 10 cm high, without admission of gas;
   (c) permitting hydrogen sulfide which remained unreacted in the individual liquid matter-receiving zones to collect in the respective gas zones and finely redispersing it in the liquid matter-receiving zone directly upstream of the respective gas zone by allowing the hydrogen sulfide to flow through a plurality of openings into the acid, the latter being delivered from the respective liquid-matter-receiving zone to the next downstream liquid-matter-receiving zone, and introduced thereinto directly below the liquid matter level therein;
   (d) separating precipitated arsenic sulfide from the acid coming from the lower end of the gas admission zone, and
   (e) freeing the filtrate obtained from excess gaseous hydrogen sulfide.

2. Process as claimed in claim 1, wherein the gas admission zone is subdivided so as to comprise 5 to 10 separate liquid matter-receiving zones and the respective gas zones.

3. Process as claimed in claim 1, wherein the hydrogen sulfide gas is maintained under a pressure of 0.2 to 1.0 bar.

4. Process as claimed in claim 1, wherein gaseous hydrogen sulfide is passed through the gas admission zone at a rate of 40 up to 200 l/h per $cm^2$.

5. Process as claimed in claim 1, wherein the ratio by volume of polyphosphoric acid put through per unit time through the gas admission zone to gaseous hydrogen sulfide passed therethrough per unit time is less than $1.0\times10^{-3}$.

* * * * *